Figure 1:
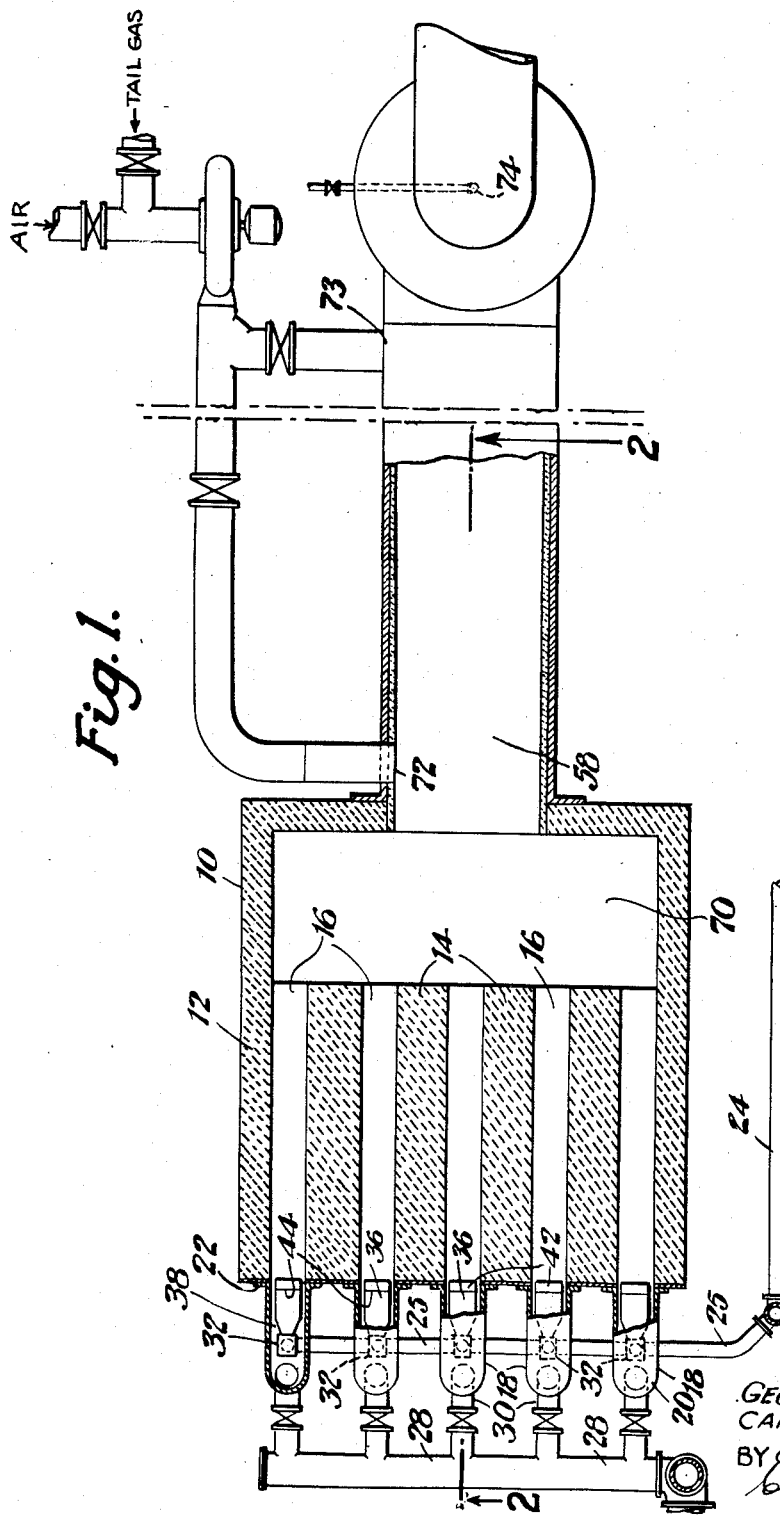

Jan. 24, 1939.  G. L. HELLER ET AL  2,144,971
MANUFACTURE OF CARBON BLACK
Filed June 27, 1936  2 Sheets—Sheet 1

INVENTORS,
GEORGE L. HELLER
CARL W. SNOW
BY Edmund Morden
ATTORNEY

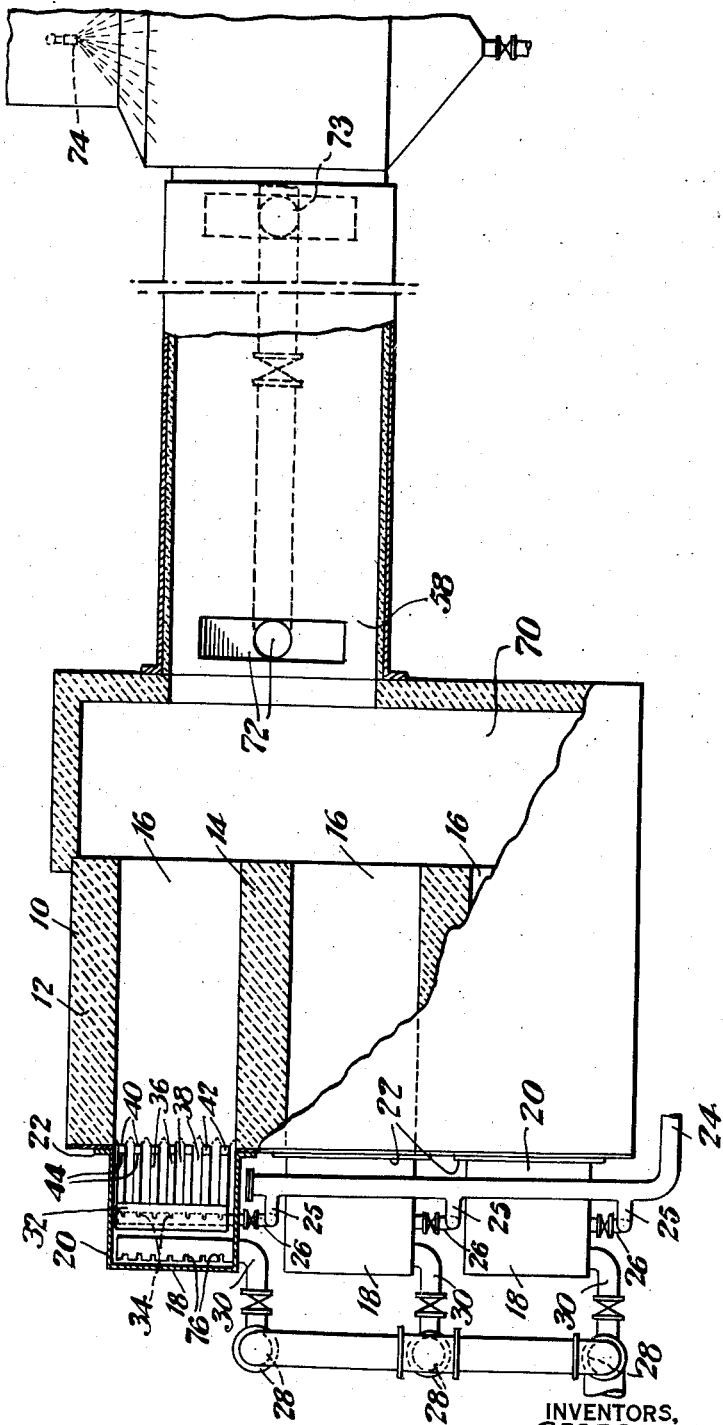

Patented Jan. 24, 1939

2,144,971

UNITED STATES PATENT OFFICE 2,144,971

MANUFACTURE OF CARBON BLACK

George L. Heller and Carl W. Snow, Pampa, Tex., assignors to General Atlas Carbon Company, Dover, Del., a corporation of Delaware Application June 27, 1936, Serial No. 87,657

4 Claims. (Cl. 134—60)

The present invention relates to the production of carbon black, and more particularly concerns an improved method of and apparatus for producing carbon black.

Most of the carbon black at present produced in this country is made by one of two methods. Channel black is produced by incompletely burning a hydrocarbon gas, usually natural gas, in a large number of small burners, and impinging the flames from the burners on a comparatively cold metal channel or plate. The yield of channel black per 1000 cubic feet of natural gas used in its production is relatively small, amounting in commercial plants only to about 3½% of the carbon present in the gas treated. However, the channel black has a high color value and more desirable physical properties for most purposes than any other type of carbon black. The other principal method of manufacturing carbon black is generally referred to as the thermal decomposition method. According to this method the hydrocarbon gas is decomposed without partial combustion by contacting it with hot checker brick or other solid surfaces previously heated to a temperature above the dissociation temperature of the hydrocarbon. The black thus produced by thermal decomposition normally has only about 15% of the color value of channel black, and is deficient in other physical properties, although the yield of black by the second method may be as much as 25% of the carbon present in the gas treated.

The method of and apparatus for producing carbon black which forms the subject of the present invention has been developed as an improvement on the invention which is described in the U. S. patent of David J. Beaver, No. 1,902,753, patented March 21, 1932. The invention of the Beaver patent is based on the discovery that carbon black can be produced in high yield by incomplete combustion of natural gas, when carrying out the combustion reaction and the resulting dissociation of the hydrocarbon out of contact with any solid or liquid surface. Carbon black produced in accordance with the process of the Beaver patent has a color value and other physical properties which are intermediate those of channel black and so-called thermatomic black produced by the thermal decomposition method hereinabove referred to.

The primary object of the present invention is to provide improvements in method and apparatus whereby the basic principles of the invention of the Beaver patent above referred to can be applied to yield carbon black having a color value and other physical characteristics more nearly corresponding to those of channel black. Another object of the invention is to provide method and apparatus whereby to produce, by the incomplete combustion of natural gas or other hydrocarbon gas, a higher yield of carbon than can be obtained by the so-called thermal decomposition process, and higher grades of carbon than can be obtained by all other known processes with the possible exception of the so-called channel black process.

With the above stated objects and features in view, the invention consists in the improved method of and apparatus for producing carbon black which is hereinafter described and more particularly defined by the accompanying claims.

In the drawings forming part of this specification, there has been illustrated somewhat diagrammatically the preferred apparatus design for carrying out the preferred method of the present invention. In the drawings, Fig. 1 is a plan view, with parts in horizontal section, showing the carbon black furnace; and Fig. 2 is a view in vertical elevation, with parts shown in section, taken on the line 2—2 of Fig. 1.

By comparison of the drawings of this application and of the aforementioned Beaver Patent No. 1,902,753, it will be noted that the design of the carbon black producing furnace of the present invention follows closely in principle the design of the apparatus of the Beaver patent, the chief distinguishing features being that according to the present invention the carbon black furnace is designed for substantially horizontal flow of gases through the partial combustion zone (instead of vertical flow as in the Beaver apparatus), and that the individual gas burner elements of the present invention are of much smaller capacity than those contemplated by the Beaver patent. Referring now to the drawings of the present invention, the numeral 10 designates a carbon black furnace having refractory insulating walls 12 and embodying vertically and horizontally disposed partition walls 14 which divide the forepart of the furnace into a large number of individual combustion chambers 16 all having their major axes horizontal. Burner elements 18 corresponding in number to the number of combustion chambers 16 are mounted at the vertical front wall of furnace 10. Each burner element 18 has a casing 20 which is dimensioned to fit the front end of one of the combustion chambers 16 and which is attached to the front wall of the furnace by flanges 22. These burner elements serve as hydrocarbon gas and air supply ducts for the furnace, and are disposed on the front wall of the furnace for ease of access for purposes of rapid removal, cleaning and replacement.

The hydrocarbon gas which is to be used as a source of carbon black is conducted to the furnace by a pipe 24 from which manifolds 25 and individual valved feed lines 26 conduct the gas to each of the burner elements 18. Air for supporting partial combustion of the gas within the furnace is conducted thereto through manifolds 28 and valved connecting pipes 30 which lead the air at a controlled rate to each of the burner elements 18. Pressure regulating valves and flow meters (not shown) are connected in the main gas and air supply pipes to assist the operators in maintaining the desired pressure and ratio of gas and air.

Within the burner elements 18 the individual gas supply pipes 26 are enclosed by a vertical gas supply manifold 32 which is conveniently constructed in the form of a rectangular box. Manifold 32 forms a part of the gas burner, and within this manifold the corresponding pipe 26 is notched or slotted as indicated at 34 to permit hydrocarbon gas to pass from pipe 26 into the interior of manifold 32. Slots 34 are distributed uniformly along the vertical sides of pipe 26 within the manifold so that gas may be supplied to the manifold 32 uniformly throughout its length.

As previously indicated, the heat necessary for supporting dissociation of the hydrocarbon gas into carbon black is developed by partial combustion of the gas within the furnace. The burners by which the gas is introduced into the combustion chambers 16 comprise a plurality of narrow parallel gas burner ducts 36 extending forwardly and horizontally from manifold 32 into the corresponding combustion chamber 16. Ducts 36 are broadened or flattened out in front of and adjacent manifold 32 so that, as illustrated in Figs. 1 and 2, their width is about two to four inches less than the width of the combustion chamber 16 so as to provide sufficient clearance between the edge of the burner and the wall. The spaces between adjacent gas ducts 36 and between the edge of the ducts and the walls 14 of the combustion chamber serve as air ducts 38 surrounding the gas ducts 36 and distributing air for combustion equally thereto. By this arrangement the air and gas supplies to the furnace are directed in parallel stream line flow before the air and gas come into contact.

The gas ducts 36 have mouths 40 through which the gas discharges in horizontal thin sheets into the combustion chambers 16. The flame fronts in which complete combustion of the gas to $CO_2$ and water occurs occupy approximately the position between and forwardly of the burners as indicated by dotted lines in Fig. 2. It will be seen that the flame fronts from adjacent burners eventually intersect or impinge at their forward ends whereby passage of uncombined oxygen beyond the flame front is prevented, as is also combustion of free carbon particles by free oxygen. In the arrangement illustrated, all of the ducts 36 have the same form and size. Also the forward ends of the burner 36 are exposed to high temperature and are accordingly fitted with high temperature alloy tips 42 which are durable under the high temperature conditions to which they are exposed in the normal operation of the furnace. Tips 42 may be secured to the bodies of the burner ducts 36 by socket or welded joints indicated by numerical lines 44.

Examination of the different portions of a typical flame adjacent the burner of a carbon black furnace has shown that in a certain zone of the flame prior to that in which formation of carbon occurs, a certain amount of hydrocarbon cracking and polymerization takes place. One of the principal features of the present invention rests on the discovery that a great improvement in both yield and quality of carbon black produced from natural gas can be secured if the gas is first subjected to a preliminary cracking and polymerization treatment, followed by partial combustion in accordance with the stream line flow dissociation principle of the aforementioned Beaver Patent No. 1,902,753. The apparatus necessary for effecting this preliminary cracking and polymerization of the gas will not be described.

As indicated in the drawings, the mixture of flue gases laden with carbon black which is produced in each of the combustion chambers 16 of the furnace 10, is discharged into a collection chamber 70 at the rear end of the furnace, from which the hot gases pass through a long straight gas offtake flue 58 within which the gases and entrained black flow while undergoing cooling by heat transfer to atmosphere through the walls of the flue. After entering the flue 58 this hot gas may be partly quenched by introduction of cold tail gas from the process at the point 72, and after passing the reaction tubes the gas is further cooled by radiation and cold water sprays 74. From this point on, the apparatus employed for recovering the black is not illustrated, but normally would include an electrical precipitator, cyclone collectors, and any other black recovery equipment necessary for effecting efficient separation of black from the gas before discharge of the tail gas to the stack.

As previously indicated, the process and apparatus of the present invention utilizes some of the principal features of the invention described in the aforementioned Beaver Patent No. 1,902,753. Thus the operation in the furnace 10 contemplates partial combustion of the hydrocarbon gas within the combustion chambers 16 under conditions such that a uniform thin flame front is formed and maintained around the stream of hydrocarbon gas issuing from each burner tip 42 as the gas stream moves forwardly through the combustion chamber in streamline non-turbulent flow. The heat developed by the flame is relied on for maintaining the temperatures necessary for decomposing the hydrocarbon within the flame front as the gas diffuses from the center of the gas stream out to the flame front during such streamline movement of the flowing contiguous gas and air streams. For the purpose of securing the highest practicable yield of carbon black from the gas, the process and apparatus is designed to provide the longest practicable flame periphery for a predetermined cross-sectional area of the gas stream, in order to provide the maximum useful energy for decomposing the gas by heat radiated from one flame front through the gas within the flame to the adjacent flame front. By this method of operation the heating efficiency is materially improved over prior art practice, so that with comparable proportions of gas and air, temperatures can be developed which are of the order of 25% higher than those obtainable by non-streamline turbulent combustion methods.

One feature of the present invention is that the gas is introduced into the furnace in spaced sheets through burner ducts which are wide and very much thinner even than the burners disclosed by the aforementioned Beaver patent. Thus the optimum thickness of the gas stream issuing from the burner tips when operating in accordance with the present invention with the object of producing a black corresponding substantially in properties with channel black, is in the range of 1/8–1/4 inch. This optimum dimension of the gas burner has been determined as a result of the discovery that the thickness of the gas stream issuing from the burner is an important factor in controlling the characteristics of the black produced. The width of the gas duct may vary over a wide range, say from 8" to 12", for the width does not apparently affect the yield or character of the black, but the thickness does have to be carefully restricted in accordance with the character of the black desired.

The preliminary cracking reaction to which the gas may be subjected before introduction to the burner also plays an important part in increasing the yield as well as improving the character of the black, partly by reason of the fact that the unsaturated polymers produced during the preliminary treatment of the gas yield on thermal decomposition a black of much better quality than that produced in thermal decomposition of saturated gaseous aliphatic hydrocarbons, and the hydrogen produced on cracking selectively reacts with the oxygen of the air and thereby leaves a larger proportion of the hydrocarbon unattacked by oxygen and free to undergo dissociation to thereby increase the yield of black per unit volume of natural gas originally delivered to the plant for treatment.

In order to insure maintenance of streamline flow of gas and air through the combustion chamber 16, the velocity ratios of the air and gas entering the combustion chamber at the plane of the burner tips is preferably in the range of 1 to 1.2, though it can be operated over a wider range of from .9 to 2. Under the best conditions of operation, the ratio of the periphery of the flame issuing from the burners taken transversely at or adjacent the burner tips, to the area of the gas stream at such point, measured in corresponding units, lies between 8 and 12. The preferred ratio is about 10.

As illustrated in the drawings, the air is introduced to the burner elements 18 through vertical extensions of pipes 30 at points ahead of the gas manifolds 32, the portion of each pipe 30 within the burner element being slotted or notched as indicated at 76 to discharge air uniformly along the length of the pipe. The air thus introduced into the burner elements may be initially introduced under pressure, or it may be drawn through the apparatus by induced draft. In either case, the relative volumes of gas and air are regulated by the indicated valves and are measured by meters (not shown).

The relative proportions of air and gas are carefully controled within the optimum limits previously indicated for the purpose of insuring production of maximum yields of black of maximum color value and desirable physical properties. The optimum volume ratio of air to gas lies in the range of 40 to 60% of the volume of air theoretically necessary to effect complete combustion of the natural gas originally supplied to the apparatus through pipe 46.

The temperature which is maintained in the combustion chamber 16 may be varied over a considerable range, depending upon the type of black it is desired to produce. However, the best type of black is produced when the temperature is carefully regulated within the range 2,000 to to 2500° F., the optimum temperature being in the neighborhood of 2,000° F. This temperature is registered by thermocouples located in the walls of combustion chambers 16 (not shown). The temperature thus registered is not the actual flame temperature, but approximates the flame temperature because of the large amount of radiant energy which is efficiently utilized in effecting decomposition of the gas. This efficient utilization of the energy developed by the flame is obtained by so arranging the burners that the largest possible surface of any flame radiates to another flame and not to a solid wall. In other words, multiple burners capable of producing thin, broad and flat flames, are employed in order to insure formation of a maximum amount of carbon black within each flame through activation by direct radiation from other flames. With the burners arranged as illustrated, the gas sheets issuing from each burner are subjected to direct radiation from the flames issuing from all of the other burners, and the gas burners are preferably proportioned to about 30 to 40 times as wide as they are thick in order to efficiently utilize the radiation effect.

By operating with a furnace and burner design and plan of operation such as forms the subject of the present invention, it is possible to obtain a yield of black which comprises 30% or more of the available carbon in the hydrocarbon gas supplied for treatment, and at the same time to produce a carbon black which has a color value and other physical characteristics closely approximating those of the best grades of channel black.

It is important and desirable that a period of not more than two seconds shall elapse between the time that a unit volume of the gas is introduced into the furnace 10 from a burner tip 42 and the time when the gaseous products of combustion laden with black are cooled to a temperature below say 1,500° F. This means that the gases and carbon should not be allowed to sojourn in the combustion chamber 16 and furnace 10 for a period substantially in excess of one second. Any substantial increase in the time of sojourn of the gases and produced carbon in the high temperature dissociation zone results in a corresponding decrease in the yield of usable black, as well as in a lowering of the quality of the black recovered. The optimum conditions for operation are those in which the time of sojourn of the gases in the decomposition zone of furnace 10 is reduced to a minimum consistent with the production of carbon black entirely within the gas stream, without decomposition of any hydrocarbon at the walls of the furnace. In other words, the optimum condition is one in which the time of contact is reduced to a minimum consistent with the maintenance of streamline non-turbulent flow of gases through the furnace 10.

With respect to reaction between the carbon black and hot furnace gases leaving the furnace 10, it may be stated that this reaction is relatively slow, particularly since operation in accordance with the process of the present invention produces relatively small proportions of carbon monoxide and carbon dioxide in the exit gases. Nevertheless this period of contact should be held to a minimum and should not be allowed to exceed two or three seconds at temperatures above 1500° F., because some reaction does take place and too long exposure of the black to these gases has a deleterious effect on the character of the black. Apparently, however, a brief exposure of the black to the hot gases is beneficial, providing that the black is not contacted with solid surfaces during such exposure. Also some of the physical properties of the black are improved by rapid quenching and contact with cold flue gases or even with air admitted at 75, providing that the black is not contacted with air at temperatures above 1500° F. Contact of the black with air at lower temperatures apparently has the effect of displacing any carbon monoxide and hydrogen absorbed on the surface of the black and of increasing the color intensity and the absorbing power of the black thus treated.

While the foregoing description has been particularly directed to the production of a black having as nearly the properties of channel black as possible, the process is also applicable in principle to the production of other types of black such as the black known to the trade as CS-3. As previously indicated, channel type black is best obtained by employing burners having a maximum flame thickness of about ¼" and by maintaining a temperature not substantially exceeding 2000° F. in the gases passing through the combustion chamber 10, with rapid cooling of the carbon laden tail gas. This maximum temperature is normally maintained under streamline flow conditions at a distance of from 12" to 18" away from the tips of the burners. As the maximum temperature is increased to around 2300° to 2500° F., the character of the black produced has more of the properties of CS-3 black rather than of channel black, and the same result is obtained when the size of the burners is increased to ⅜ to ½ inch, and when the point of maximum temperature is shifted to from 3½ to 5 feet away from the burner tip.

Having thus described the invention, what is claimed as new is:

1. An apparatus for the production of carbon black by partial combustion of hydrocarbon compising a furnace having a plurality of combustion chambers in the forepart of the furnace and a single collection chamber in the back part of the furnace, each combustion chamber communicably connected with the collection chamber at its discharge end and having its major axis horizontal, a plurality of relatively narrow burners arranged in the front part of each combustion chamber with their major axes parallel, the outlet end of each burner having an effective thickness of between $\frac{1}{16}$ and ¼ inch and having inside transverse cross-sectional perimeters adjacent their outlet ends between eight and twelve times their cross-sectional area at the same ends, a gas outlet flue leading off from the rearward end of the furnace, and an inlet for gas opening into the gas outlet flue at the inlet end of the flue adjacent the collection chamber.

2. An apparatus for the production of carbon black by partial combustion of hydrocarbons comprising a furnace having a plurality of horizontally disposed combustion chambers in its front end each communicably connecting with a single collection chamber in the rear end of the furnace, a gas burner occupying the forepart of each combustion chamber embodying a plurality of gas burner ducts with spaced air ducts therebetween, all arranged with their major axes parallel and horizontal, the discharge tip of each burner duct having an effective thickness of $\frac{1}{16}$–½ inch and having a width of several inches, the combined cross-sectional area of the gas and air ducts corresponding with the cross-sectional area of the combustion chamber, a gas outlet flue leading out horizontally from the rearward end of the collection chamber, and means for introducing a quenching fluid into the gas outlet flue at a point adjacent the inlet end thereof.

3. In the manufacture of carbon black, the steps comprising directing into a heated unobstructed combustion chamber horizontally flowing parallel thin contacting sheets of hydrocarbon gas and air, the sheets of air flowing in streamline relation with respect to and upon each side of the said sheets of gas, partially burning the gas at the surface of contact of the gas sheets with the air thereby developing temperatures at which carbon black is produced within the gas sheets while each gas sheet is surrounded by a viscous flame front of combustion gases, adjusting the proportions of gas and air introduced into the chamber and the absolute velocities of flow to shift the location of the high temperature dissociation zone in accordance with the character of black desired within a distance of one to five feet from the point at which the gas and air streams first come into contact as they enter the chamber, conducting the flowing stream of gases and carbon black from the dissociation zone into and through an enlarged blending chamber wherein some turbulence develops and thence through a gas offtake flue, and rapidly cooling the gaseous products and entrained black by contact with quenching fluids to temperatures below 1500° F. while continuing the gas flow in a substantially straight horizontal path.

4. The process as defined in claim 3 in which the stream of gases and produced carbon black is contacted with air after lowering its temperature below 1500° F.

GEORGE L. HELLER.
CARL W. SNOW.